United States Patent Office 3,499,858
Patented Mar. 10, 1970

3,499,858
POLYURETHANE-POLYUREA ELASTOMERS
Albert Pierre Strassel, Courbevoie, France, assignor to Ugine Kuhlmann (Societe Anonyme), Paris, France, a corporation of France
No Drawing. Filed July 18, 1966, Ser. No. 565,676
Claims priority, application France, July 22, 1965, 25,651
Int. Cl. C08g 22/02, 22/04
U.S. Cl. 260—30.2     16 Claims

ABSTRACT OF THE DISCLOSURE

In the method of preparing polyurethane-polyurea compositions by mixing a prepolymer obtained by reaction of a polyol with an excess of polyisocyanate, with at least one diamine having a melting point of over 60° C., the improvement which comprises utilizing said diamine in the form of a supersaturated solution in at least one aprotic polar solvent for said diamine.

---

This invention relates to a method of preparing polyurethane-polyurea elastomers, which in particular permits the utilisation of these products in applications which hitherto were considered to be difficult of achievement.

The invention also relates to new industrial products comprising films, sheets, or other compact or cellular moulded products obtained from the polyurethane-polyurea compositions prepared by this method.

Polyurethane-polyurea compositions are generally obtained by mixing a prepolymer prepared by reaction of a polyol with an excess of polyisocyanate and a primary or secondary diamine or an amino alcohol which acts as a chain elongator and/or as a cross-linking agent. The primary diamines which can be used are crystallised solids having a high melting point, which is generally higher than 60° C.

In order to achieve effective intimate mixing of the prepolymer and diamine components, the procedure has hitherto been to melt the diamine and mix it in the molten state with the prepolymer, which has preferably been brought to a temperature close to the melting point of the diamine in order to avoid recrystallisation. It will readily be understood that these temperature conditions have a considerable influence on the speed of the reaction, to such an extent that it is difficult and even sometimes impossible to utilise the product by casting or injection moulding a few seconds or a few minutes after mixing.

It is therefore extremely advantageous to mix a prepolymer at ambient temperature with a diamine in the cold state. In order to do this it has been proposed to form a dispersion of the finely pulverised diamine, but in these circumstances mixing is not sufficiently intimate to obtain the expected mechanical properties of the elastomer. It has also been suggested to dissolve the diamine in a solvent, but the solvents proposed give rise to considerable shrinkage and also to structural defects; in addition, this method makes it necessary for the elastomer, before being baked, to be kept for a long time in the cold state or at a temperature below the boiling point of the solvent, in order to permit the partial evaporation of the latter. These previously known methods of bringing prepolymers and diamines into contact are therefore unsatisfactory.

It is moreover known that a solution of a diamine in a polyol is stable in the cold state under certain conditions. A solution of this type may be mixed with a polyurethane prepolymer at ambient temperature. For a given prepolymer however, on the one hand the NH$_2$/OH ratio of the final elastomer is thus limited because of the restricted solubility of the diamine in polyols, while on the other hand it is necessary in most cases to use a reaction catalyst in order to compensate for the difference in reactivity of the hydroxylated compound with the isocyanate as compared with that of the amine with the isocyanate.

It will moreover easily be understood that the addition of a catalyst to the mixture, even in the cold state and even in minimum proportions, reduces the pot life of the mixture to a considerable extent, so that very often the pot life is scarcely lengthened as compared with the technique utilising the melting of the diamine.

The present invention obviates these disadvantages. The method of the invention in fact permits mixing in the cold state of the constituents of the polyurethane-polyurea elastomer, while this liquid mixture may be preserved for a sufficient length of time to enable it to be applied and shaped without difficulty before cross-linking makes it unsuitable for these operations.

More specifically, the invention relates to a method of preparing polyurethane-polyurea compositions consisting fundamentally in effecting the mixing, advantageously at ordinary temperature, of the prepolymer obtained in a manner known per se by reaction of a polyol on an excess of polyisocyanate and at least one diamine, the latter being used in the form of a supersaturated solution in an aprotic polar solvent or a mixture of such solvents, optionally in the presence of additives, such as surfactants.

It is known that a solvent is said to be "aprotic" when it does not exchange protons with the substances dissolved. This class of solvent is illustrated for example by the article by A. J. Parker in "Quarterly Reviews" (1962), 16, pages 163–187.

The invention is based on the fact that an aromatic diamine can be kept at ambient temperature and for a certain time in a state of superfusion or supersaturation in a small quantity of a dipolar aprotic solvent or a mixture of solvents of this class. A solution of this type, which is extremely concentrated, is stable for a longer or shorter space of time which varies in dependence on the nature of the diamine and of the solvent, the temperature, and the concentration. Certain additives, which will be described hereinbelow, are likewise capable of modifying this period of time.

The solvents which are suitable according to the invention for keeping the crystallised diamines in supersaturation at a given temperature are, as has previously been stated, the aprotic polar solvents which are miscible with the molten diamine, possibly in the presence of additives. Purely illustrative examples of such solvents are the following:

dimethylacetamide
dimethylformamide
dimethylsulphoxide
tetrahydrothiophene dioxide (sulpholane)
acetonitrile
tetrahydrofuran
nitrobenzene
acetone
propylene carbonate, etc.

According to the invention mixtures of the solvents may be used, sometimes with advantage.

According to another characteristic of the invention, use is preferably made of solvents having a high dielectric constant, particularly one higher than 25 (measured at 30° C.).

However, in cases where for various reasons it is not possible to select the solvent having the highest dipole moment and dielectric constant, the invention provides for the joint use of a solvent having a lower dipole moment and certain additives.

According to the invention it has in fact been found that any solvent has improved abilty to keep a diamine in supersaturation if it is in the presence of certain additives, such as for example surfactants. In this case the solvent can be selected from the dipolar aprotic solvents or from another class of solvents, the result being nevertheless particularly remarkable when dipolar aprotic solvents are used.

As examples of additives, use will preferably be made of non-ionic surface active agents, such as polyoxyalkylene glycols, particularly those which have a high ethylene oxide/propylene oxide ratio, whether these agents are classified as anti-foaming or foaming. It is also possible to use silicone oils, monoethers of polyoxyalkylene glycols, and so on. These additives will be used in the form of traces or of small quantities. Quantities of surface active additives not exceedings 5% by weight referred to the solution of diamine in the solvent will generally be suitable.

By this means it will therefore be possible to reduce still further the quantity of solvent necessary to keep the diamine in superfusion or supersaturation, or even to permit in certain cases the use of other non-aprotic bipolar solvents, although the results obtained are then less good.

In order to prepare a supersaturated diamine solution which is stable for a given period of time at a given temperature, for example at ordinary temperature, the diamine or the mixture of diamines may be melted and poured into the selected solvent, in the presence or absence of additives. The mixture of diamine and solvent, with or without an additive, may however also be brought to a temperature close to the melting point of the diamine until a homogeneous mixture is obtained.

The diamines will be selected from primary or secondary diamines. The diamines preferred for the method of the invention are aromatic diamines currently used for casting polyurethane elastomers, such as for example 3-3'-dichloro-4-4'-diamino-diphenylmethane or dichlorobenzidine. However, other diamines, such as diaminodiphenylmethane, 2-4-diaminotoluene, O-tolidine, benzidine, metaphenylenediamine, or mixtures thereof, are however also suitable. This list moreover is by no means exhaustive.

The liquid polyurethane prepolymers containing free isocyanate groupings utilised in the method of the invention are those which are normally used and are well known. They are obtained by reaction of a multifunctional polyether or polyester polyol with a polyisocyanate.

According to the invention, any type of polyurethane prepolymer composition may be used, because the method permits the mixing in the cold state of a polyurethane prepolymer containing free isocyanate groupings with a diamine in supersaturated solution in the cold state.

The supersaturated diamine solution utilised according to the invention differs essentially by its concentration from previously known solutions of diamine in conventional solvents. The latter must in fact be used in large quantities in relation to the diamine. On the contrary, according to the invention, the quantities of solvents used to keep the diamine in supersaturation are very low, so that the disadvantages due to the presence of large quantities of solvents are eliminated. This small quantity of solvent is nevertheless sufficient to make it possible to obtain extremely intimate mixing of the components and enables the viscosity of the mixture to be substantially reduced, thus facilitating its application. In a general way the quantity of polar aprotic solvent used according to the invention is at most one fifth of the quantity of solvent which was used in the prior art to form a solution of diamine.

According to the invention it is thus possible, even at ordinary temperature to effect the mixing of a diamine in supersaturated solution with the prepolymer, the small quantity of solvent present being in no way a hindrance to the cross-linking. On the contrary, the dipolar aprotic nature of the solvent makes it possible for the "gelling" of the mixture to be slightly retarded.

The fundamental advantage of the method of the invention is therefore that it is possible to obtain at ambient temperature a mixture of the constituents of the polyurethane elastomer which is stable at ambient temperature for a period ranging from a few minutes to a few hours, depending on the formula. On the other hand, as soon as this mixture is brought to its application temperature, the isocyanateamine reaction is considerably accelerated, so that crosslinking takes place after a few minutes at these temperatures. Extended pot life of the mixture is thus combined with very rapid cross-linking.

Another advantage of the invention is that the elastomer can be subjected to cross-linking at ordinary temperature, if so desired. The final properties of the elastomer will in these circumstances be obtained after a longer time than at a high temperature, this time ranging from a few hours to a few days in some cases. If desired it will be possible to utilise catalysts forming urea groupings, such as tertiary amines, substituted ureas, organo-metallic salts, carboxylic acids, or other known accelerators.

Obviously, although it is particularly advantageous to use a supersaturated solution of diamine at ambient temperature, it is also possible to use such a solution at any temperature, provided that the latter is below the boiling point of the solvent. In particular, it will be possible to operate with a conventional machine without fear of recrystallisation in the pipes.

The examples below illustrate the invention without limiting it in any way.

EXAMPLE 1

20 g. of 3-3'-dichloro-4-4'-diamino-diphenylmethane were melted and poured into the quantities of dimethylsulphoxide indicated in Table I. The mixture was vigorously agitated and a note was made of the time after which the first crystals appeared, the solutions being left at 20°.

Table I

| Dimethylsulphoxide: | Time after which the first crystals appeared |
|---|---|
| 4 g. | h__ 1 |
| 5 g. | h__ 2 |
| 7 g. | days__ 8 |
| 9 g. | month__ >1 |

EXAMPLE 2

20 g. of 3-3'-dichloro-4-4'-diamino-diphenylmethane were melted and, with agitation, poured into 5 g. of dimethylsulphoxide containing different quantities of a methylpolysiloxane having a viscosity of 20 ck. at 25° and a surface tension of 20.6 dynes per cm. at 25°.

Different solutions were obtained, of which the stabilities at 20° are indicated in Table II.

Table II

| Methylpolysiloxane (20 ck.): | Time after which the first crystals appear |
|---|---|
| 0.1 g. | h__ 3 |
| 0.15 g. | h__ 7 |
| 0.5 g. | h__ 24 |

EXAMPLE 3

20 g. of methylenedianiline were melted. This molten diamine was poured into 10 g. of dimethylsulphoxide. The solution was kept for more than a month without the diamine crystallising.

EXAMPLE 4

20 g. of 3-3'-dichloro-4-4'-diamino-diphenylmethane were melted and poured into 10 g. of dimethylformamide in one case, into 10 g. of sulpholane in another, into 9 g. of dimethylsulphoxide in yet another, and finally into 12 g. of tetrahydrofuran. These solutions remained stable for several months.

EXAMPLE 5

A supersaturated solution of 20 g. of 3-3'-dichloro-4-4'-diamino-diphenylmethane in 7 g. of dimethylformamide and 0.5 g. of an oxyethylated and oxypropylated ethylene diamine of a mean molecular weight of 3400, containing 10% of ethylene oxide, remained utilisable for six hours at 20°.

As soon as this solution cooled and before crystallisation started, it was possible to use it for mixing in the cold state with a polyurethane prepolymer the composition of which is given in Example 2 (mixture A) of French Patent No. 1,285,576 applied for on Mar. 27, 1961, in such a manner that the $NCO/NH_2$ ratio is equal to 1.16.

The prepolymer had previously been degasified for 15 minutes at 80° under a pressure of 5 mm. of mercury. The supersaturated solution and prepolymer were mixed at 20° with the aid of a mechanical agitator, care being taken not to enclose air in the viscous liquid. The latter was heated to 25°. It was then poured on to a plate brought to a temperature of 120°, 40 minutes after mixing. After baking for two hours at 120°, an elastomer was obtained the mechanical properties of which, measured after ten days, were as follows:

Tensile strength (kg./square cm.) _____ 300
Shore A hardness (10 seconds) _____ 78
Tearing (kg./cm.) _____ 90

EXAMPLE 6

The supersaturated solution of 20 g. of 3-3'-dichloro-4-4'-diamino-diphenylmethane in 5 g. of dimethylsulphoxide remained stable for two hours at 20°. Before recrystallisation, it was mixed with the prepolymer PE III described in the French patent application filed under No. PV 992,968 on Oct. 28, 1964, now French Patent No. 1,427,722, issued Jan. 3, 1966 for "Polyether-polyurethane-polyurea Compositions and Applications Thereof" in such a manner that the $NCO/OH+NH_2$ ratio of the final elastomer was equal to 1.

Mixing was effected at 20° by slow mechanical agitation in order to avoid the inclusion of air in the viscous liquid. The mixture remained utilisable for pouring for 40 minutes. A plate was cast in a mould, as well as objects such as gears or rollers, and a joint was cast beween two concrete bars. For 15 minutes after mixing at 20° it was possible to apply the composition by brush to supports such as wood, metal, paper, concrete.

After 60 minutes at 20° it was possible to apply it by knife in order to fill in a crack in a concrete slab, or to inject it by pressure into a mould.

In all the aforesaid applications, the baking of the elastomer was not attempted. After 10 days it was tested and the following results were obtained:

Tensile yield point (kg./square cm.) _____ 180
Elongation (percent) _____ 400
Shore A hardness (10 seconds) _____ 86
Tearing (kg./cm.) _____ 100

EXAMPLE 7

A supersaturated solution of 20 g. of methylene dianiline in 10 g. of dimethylsulphoxide remained stable for more than one month. During this time it was possible to use it by the spray method which is described in the previously mentioned French Patent 1,427,722 of January 3, 1966, which consists in mixing the supersaturated solution of diamine with the prepolymer PE II described in said patent with the aid of an external mixing gun.

By effecting the applications mentioned in said patent, the products obtained comprised in particular films which had the following mechanical properties:

Tensile yield point (kg./square cm.) _____ 200
Elongation (percent) _____ 400
Tearing strength (kg./cm.) _____ 120

What I claim is:
1. In a method of preparing polyurethane-polyurea compositions by mixing a prepolymer obtained by reaction of a polyol with an excess of polyisocyanate, with at least one diamine having a melting point of over 60° C., the improvement which comprises utilizing said diamine in the form of a supersaturated solution in at least one aprotic polar solvent for said diamine.
2. The method of claim 1, wherein said prepolymer and supersaturated diamine solution are mixed at ordinary temperature.
3. The method of claim 1, wherein said aprotic solvent is dimethylacetamide.
4. The method of claim 1, wherein said aprotic solvent is dimethylformamide.
5. The method of claim 1, wherein said aprotic solvent is dimethylsulphoxide.
6. The method of claim 1, wherein said aprotic solvent is tetrahydrothiophene dioxide.
7. The method of claim 1, wherein said aprotic solvent is acetonitrile.
8. The method of claim 1, wherein said aprotic solvent is tetrahydrofuran.
9. The method of claim 1, wherein said aprotic solvent is nitrobenzene.
10. The method of claim 1, wherein said aprotic solvent is acetone.
11. The method of claim 1, wherein said aprotic solvent is propylene carbonate.
12. The method of claim 1, wherein said aprotic polar solvent has a dielectric constant higher than 25, measured at 30° C.
13. The method of claim 1, wherein at least one surface active agent is used in combination with said aprotic polar solvent.
14. The method of claim 13, wherein the quantity of surfactant additive does not exceed 5% by weight of the diamine solution.
15. The method of claim 1, wherein the weight ratio of said diamine to said aprotic solvent in said supersaturated solution is from 5:1 to 5:3.
16. The method of claim 1, wherein said super-saturated solution of said diamine in said aprotic solvent is stable for at least 1 hour at 20° C.

References Cited

UNITED STATES PATENTS

| | | |
|---|---|---|
| 3,180,854 | 4/1965 | Schneider. |
| 3,317,481 | 5/1967 | Youker. |
| 3,267,192 | 8/1966 | Peters. |
| 3,141,865 | 7/1964 | McElvoy. |
| 2,929,804 | 3/1960 | Steuber. |
| 2,929,800 | 3/1960 | Hill. |
| 3,294,724 | 12/1966 | Axelrood. |

MORRIS LIEBMAN, Primary Examiner

H. H. FLETCHER, Assistant Examiner

U.S. Cl. X.R.

260—30.4, 30.8, 32.4, 32.6, 32.8, 77.5